United States Patent
Schuster et al.

(10) Patent No.: US 6,810,852 B2
(45) Date of Patent: Nov. 2, 2004

(54) METHOD AND ARRANGEMENT FOR CONTROLLING AN OUTPUT QUANTITY OF A DRIVE UNIT OF A VEHICLE

(75) Inventors: Thomas Schuster, Brackenheim (DE); Stephan Israel, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/676,095

(22) Filed: Oct. 2, 2003

(65) Prior Publication Data

US 2004/0084012 A1 May 6, 2004

(30) Foreign Application Priority Data

Oct. 2, 2002 (DE) .......................................... 102 46 058

(51) Int. Cl.$^7$ .............................................. F02D 41/00
(52) U.S. Cl. ................................ 123/339.1; 123/339.14
(58) Field of Search ......................... 123/339.1, 339.14, 123/339.16, 339.17, 339.18, 319

*Primary Examiner*—Bibhu Mohanty
(74) *Attorney, Agent, or Firm*—Walter Ottesen

(57) ABSTRACT

The invention relates to a method and an arrangement for controlling an output quantity of a drive unit of a vehicle for at least one operating state of the vehicle which makes possible to optimally consider the power requests of motor-specific or vehicle-specific components without affecting the driving comfort. A desired value for the output quantity is adjusted to a target value in dependence upon at least a request of a motor-specific component or a vehicle-specific component (1, 5). This target value is furthermore adjusted in dependence upon that a driver command, which is pregiven at an operator-controlled element (10), has reached this target value in the first operating state or in a second operating state different from the first operating state. The desired value for the output quantity is likewise increased up to reaching the target value with an increase of the driver command pregiven at the operator-controlled element (10).

7 Claims, 2 Drawing Sheets

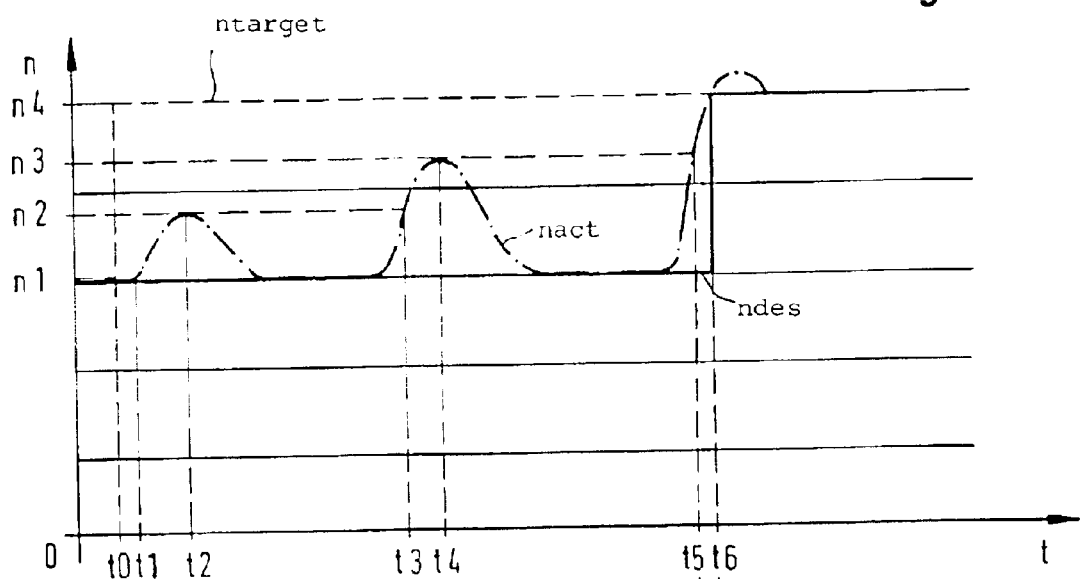
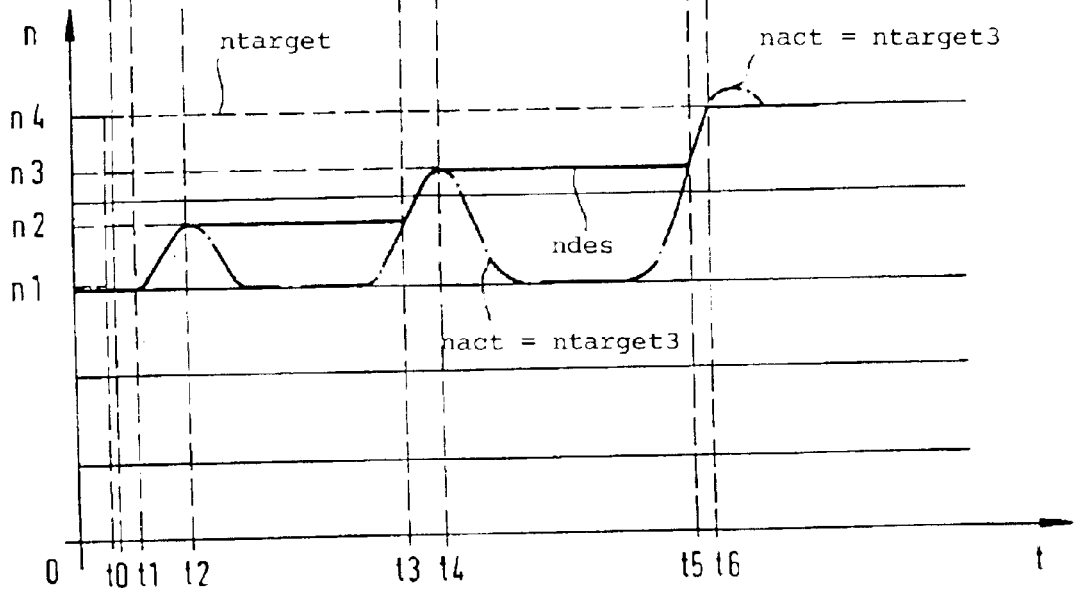

METHOD AND ARRANGEMENT FOR CONTROLLING AN OUTPUT QUANTITY OF A DRIVE UNIT OF A VEHICLE

BACKGROUND OF THE INVENTION

In modern day engine controls in a vehicle, high requirements are imposed on the safety and the driving comfort. This includes that the availability of assistance systems and comfort systems to the driver, such as windshield heating and climate control, should be as high as possible.

If the engine control determines during the driving operation that there is a power deficiency for operating ancillary equipment such as the climate control or a generator, then an increased idle rpm of the vehicle motor is requested which directly increases the rpm in the just then current operating state of the vehicle and therefore increases the output power of this ancillary equipment. An immediate increase of the idle rpm of the vehicle motor can, however, be surprising for the driver, for example, when the vehicle is just in an operating state with an engaged gear and a closed clutch and the rpm is increased by the idle controller. In this way, the vehicle speed would increase suddenly. Accordingly, the increased idle rpm, which is requested by the ancillary equipment, is only assumed as a desired value for the idle controller when the rpm of the vehicle engine is increased by the driver above the wanted increased idle rpm, for example, by actuating the accelerator pedal.

If the driver increases the rpm of the vehicle motor, for example, by actuating the accelerator pedal but does not reach the wanted increased idle rpm, then the motor control may not assume the rpm set by the driver via the accelerator pedal as the desired value for the idle controller and the rpm of the vehicle motor again settles to steady state at the then valid lower desired value when the driver has again pulled back the actuation of the accelerator pedal. In this way, the corresponding ancillary equipment cannot be supplied with the needed mechanical power.

SUMMARY OF THE INVENTION

The method of the invention and the arrangement of the invention for the control of an output quantity of a drive unit of a vehicle for at least a first operating state of the vehicle afford the advantage that a desired value for the output quantity is set to a target value in dependence upon at least a request of a motor-specific or vehicle-specific component. This target value is furthermore set in dependence upon that a driver command, which is pregiven at an operator-controlled element, reaches this target value in the first operating state or in a second operating state different from the first operating state and the desired value for the output quantity is likewise increased up to reaching the target value with an increase of the driver command pregiven at the operator-controlled element. In this way, the power deficit of a requesting motor-specific or vehicle-specific component can at least be reduced without affecting the driving comfort so that the requesting motor-specific or vehicle-specific component can nonetheless be supplied optimally with mechanical power while maintaining the driving comfort.

It is especially advantageous when the desired value is maintained with a dropping of the driver command pregiven at the operator-controlled element. In this way, the precondition for a successive reduction of the power deficit up to reaching the target value is achieved which, at any time, ensures the optimal supply of mechanical power for the requesting motor-specific or vehicle-specific component without a reduction of comfort. A once-reached power level without reduction of comfort can thereby be maintained until a higher power level is reached and assumed via a corresponding input of the driver at the operator-controlled element.

BRIEF DESCRIPTION OF THE DRAWINGS

The invention will now be described with reference to the drawings wherein:

FIG. 3 is an exemplary trace of a desired value for the idle rpm as a function of time in accordance with the state of the art; and, FIG. 4 is an exemplary trace of the desired value for the idle rpm as a function of time in accordance with the invention.

DESCRIPTION OF THE PREFERRED EMBODIMENTS OF THE INVENTION

Figure 1:
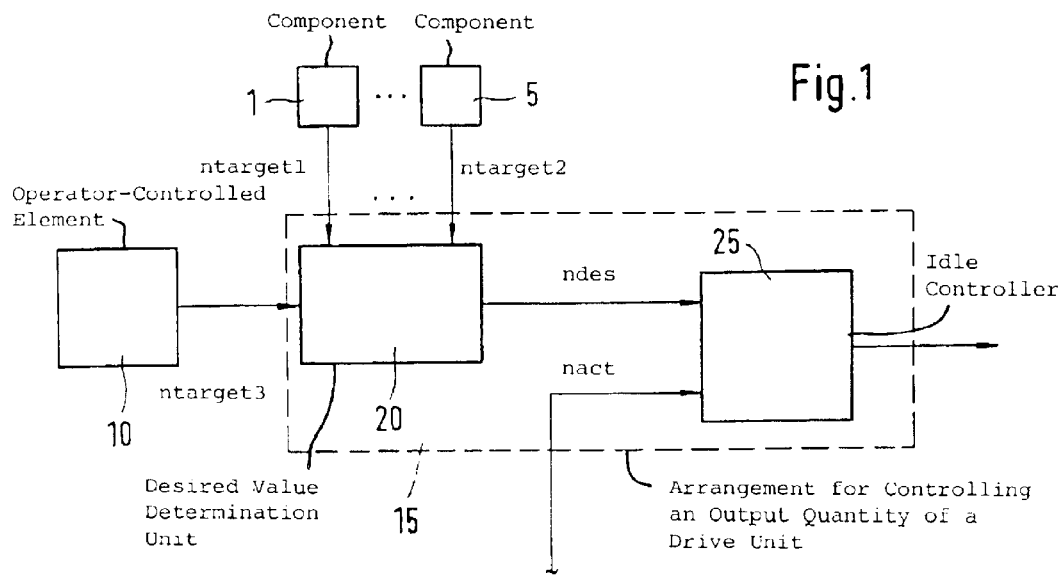
FIG. 1 is a block circuit diagram of an arrangement of the invention for controlling an output quantity of a drive unit of a vehicle.

In FIG. 1, reference numeral 15 identifies an arrangement for controlling an output quantity of a drive unit of a vehicle for at least a first operating state of the vehicle. The drive unit of the vehicle can, for example, be an internal combustion engine, an electric motor or a motor based on an alternative drive concept. The internal combustion engine can, for example, be a diesel engine or a spark-ignition engine. The first operating state of the vehicle can, for example, be an idle state. The arrangement 15 can, for example, be implemented as hardware and/or as software in a motor control of the vehicle. The output quantity of the drive unit can, for example, be an output torque of the motor of a vehicle, a transmission output torque, a wheel output torque, an output power, a motor rpm or an output quantity derived from one of the above-mentioned quantities. In the following, it is assumed by way of example, that the output quantity of the drive unit is the motor rpm. The following description can, however, be applied to any desired other output quantity of the drive unit of the vehicle in a corresponding manner.

The arrangement 15 includes means 20 for adjusting a desired value ndes for the motor rpm. The arrangement 15 furthermore includes an idle controller 25 to which, on the one hand, the desired value ndes for the engine rpm and, on the other hand, an actual value nact for the engine rpm are supplied as input quantities. The actual value nact for the engine rpm can, in a manner known per se, be determined, for example, with the aid of a crankshaft sensor. The idle controller 25 outputs at least one actuating quantity in dependence upon the difference between the desired value ndes and the actual value nact for the engine rpm in order that the actual value nact tracks the desired value ndes in the sense of a minimum control deviation. The motor of the vehicle is adjusted in a manner known per se by the at least one actuating quantity. If the motor is an internal combustion engine, then the following can be adjusted via the at least one actuating quantity: the air supply, the fuel injection and/or, in the case of a spark-ignition engine, also the ignition time point.

In the following, the means 20 is also characterized as a desired value determination unit. According to FIG. 1, the desired value determination unit 20 is connected to motor-specific or vehicle-specific components 1 to 5 as well as to an operator-controlled element 10. The number of motor-specific or vehicle-specific components connected to the desired value determination unit 20 is not limited and is at least one. In the following, it will be assumed by way of example that there is a first motor-specific or vehicle-specific component 1 and a second motor-specific or vehicle-specific component 5 which are both connected to the desired value determination unit 20. The motor-specific or vehicle-specific components (1, 5) can be ancillary equipment such as a climate control system, a windshield heater or a generator which are required for driver assistance systems or comfort systems of the vehicle. Motor-specific components can, for example, be the idle control 25 or a surge damping system. Vehicle-specific components are not motor-specific and can, for example, be a vehicle dynamic control, a vehicle speed control, a traction control or an anti-lock braking system.

According to the example of FIG. 1, the first motor-specific or vehicle-specific component 1 requests a first target value ntarget1 for the motor rpm and the second motor-specific or vehicle-specific component 5 requests a second target value ntarget2 for the engine rpm. The first target value ntarget1 is supplied to the desired value determination unit 20 by the first motor-specific or vehicle-specific component 1. The second target value ntarget2 is supplied to the desired value determination unit 20 by the second motor-specific or vehicle-specific component 5.

The operator-controlled element 10 can, for example, be configured as an accelerator pedal. Depending upon the driver command, a different actuating degree of the accelerator pedal 10 results. From the degree of actuation of the accelerator pedal 10, a third target value ntarget3 is derived for the motor rpm and supplied to the desired value determination unit 20. From the three target values ntarget1, ntarget2, ntarget3, the desired value determination unit 20 forms the desired value ndes for the engine rpm and transmits the same to the idle controller 25.

Figure 2:
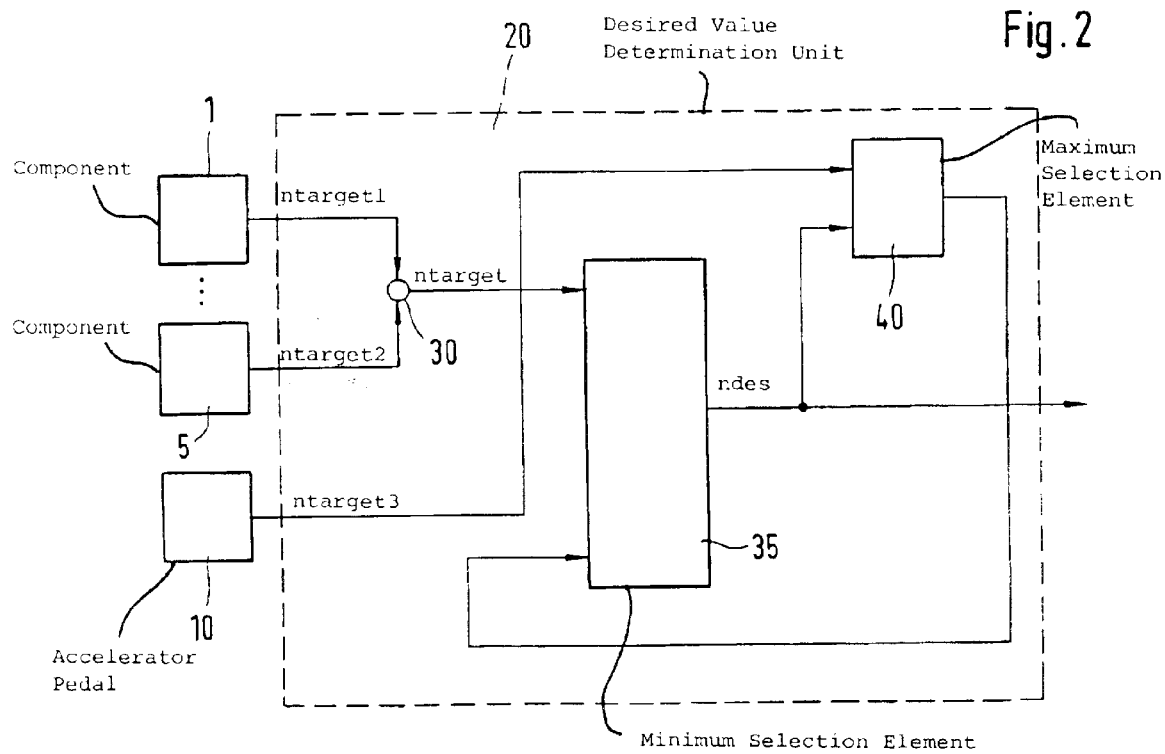
FIG. 2 is a function diagram for explaining the method of the invention.

In the following, and with the aid of FIG. 2, the configuration of the desired value determination unit 20 is described by way of example in the form of a function diagram which, at the same time, explains the method of the invention. In FIG. 2, the same reference numerals identify the same elements as in FIG. 1. The first target value ntarget1 and the second target value ntarget2 are supplied to an addition element 30 and are there added to a resulting target value ntarget for the motor rpm. If more than the two motor-specific or vehicle-specific components (1, 5) are provided, which each request their own target value component for the motor rpm, then all target value requests of these motor-specific or vehicle-specific components are added in the addition element 30 to form the resulting target value. If only one motor-specific or vehicle-specific component requests a target value, then only this request is supplied to the addition element 30 and corresponds to the resulting target value ntarget. The resulting target value ntarget is supplied to a minimum selection element 35 as a first input quantity. The output of a maximum selection element 40 is supplied to the minimum selection element 35 as a second input quantity. From the two input quantities, the minimum selection element 35 determines the minimum input quantity and outputs the same as the desired value ndes for the motor rpm to the idle controller 25. The desired value ndes for the motor rpm is furthermore supplied to the maximum selection element 40 as a second input quantity. The maximum selection element 40 is likewise arranged in the desired value determination unit 20. As a first input quantity, the third target value ntarget3 from the accelerator pedal 10 is supplied to the maximum selection element 40. The maximum selection element 40 determines the maximum from the third target value ntarget3 and the desired value ndes for the motor rpm and outputs this maximum as the second input quantity to the minimum selection element 35.

The effect of this method is described in the following based on an exemplary trace of the motor rpm (n) as a function of time (t). The trace shown in FIG. 3 is based on the procedure known from the state of the art. First, the resulting target value ntarget is the same as the first rpm value $n_1$. At a first time point $t_0$, an additional rpm request of at least one motor-specific or vehicle-specific component results which leads to an increase of the resulting target value ntarget to a fourth rpm value $n_4$ greater than $n_1$. The trace of the resulting target value ntarget is shown in FIG. 3 by the broken line. The desired value ndes for the motor rpm runs first likewise at the first rpm value $n_1$. This desired value ndes is shown by the solid line in FIG. 3. The actual value nact for the motor rpm at first also runs on the first rpm value $n_1$ and is shown in FIG. 3 by the dot-dash line. Only at a second time point $t_1$, which follows the first time point $t_0$, does the actual value nact increase because of an actuation of the accelerator pedal 10 by the driver up to a second rpm value $n_2$ at a third time point $t_2$. $n_2$ is greater than $n_1$ and less than $n_4$. From the third time point $t_2$, the actual value nact again drops to the first rpm value $n_1$ in order to thereafter increase again and to reach the second rpm value $n_2$ at a fourth time point $t_3$ subsequent to the third time point $t_2$. The actual value nact for the motor rpm increases further at a fifth time point subsequent to the fourth time point $t_3$ to a third rpm value $n_3$ greater than $n_2$ and less than $n_4$. Thereafter, the actual value nact again drops to the first rpm value $n_1$ in order to again increase up to the third rpm value $n_3$ at a sixth time point $t_5$ subsequent to the fifth time point $t_4$. The actual value nact increases still further at a seventh time point $t_6$, which follows the sixth time point $t_5$, up to the fourth rpm value $n_4$ and thereby reaches the resulting target value ntarget. As long as the actual value nact for the motor rpm has not reached the resulting target value ntarget (and therefore has not reached the fourth rpm value $n_4$) after the first time point $t_0$, the desired value ndes remains unchanged at the first rpm value $n_1$. Only at the seventh time point $t_6$ is the resulting target value ntarget reached by the actual value nact in accordance with the driver command at the accelerator pedal 10 of the vehicle so that, at the seventh time point $t_6$, the desired value ndes increases to the fourth rpm value $n_4$ and therefore to the resulting target value ntarget. Thereafter, the actual value nact for the motor rpm is controlled to the desired value ndes so that only starting from the seventh time point $t_6$, the additional rpm request of the at least one motor-specific or vehicle-specific component can be considered. Before the latter, the request of the increase of the resulting target rpm ntarget to the fourth rpm value $n_4$ is in no way considered.

FIG. 4 shows the trace of the rpm (n) as a function of time (t) as it results because of the arrangement of the invention and because of the method of the invention. Here, the same trace of the actual value nact for the motor rpm as well as the target value ntarget as in FIG. 3 is a condition precedent. The actual value nact for the motor rpm corresponds to the third target value 3 for the motor rpm which is pregiven by the driver at the accelerator pedal 10. The desired value ndes for the motor rpm also starts first at the first rpm $n_1$. Accordingly, the desired value ndes as well as also the third target value $n_3$ correspond to the first rpm value $n_1$ up to the first time point $t_0$. The first rpm value $n_1$ therefore is also present at the output of the maximum selection element 40. With the increase of the resulting target value ntarget to the fourth rpm value $n_4$ at the first time point to, nothing changes at first at the output of the minimum selection element 35, that is, the desired value ndes for the motor rpm remains at the first rpm value $n_1$. With the increase of the actual value nact or of the third target value $n_3$ starting at the second time point $t_1$, the output of the maximum selection element 40, however, increases and therewith also the output of the minimum selection element 35 and therewith the desired value ndes in the same manner. After the third time point $t_2$, the third target value ntarget3 drops but the output of the maximum selection element 40 remains at the desired value ndes reached at the third time point $t_2$, namely, at the second rpm value $n_2$ so that the second input of the minimum selection element 35 likewise remains at the second rpm value $n_2$ and the desired value ndes for the motor rpm thereby remains unchanged. The dropping of the third target value ntarget3, which is pregiven in accordance with the driver command at the accelerator pedal 10, therefore does not lead to a dropping of the desired value ndes. Rather, the desired value ndes is maintained. Only when the third target value ntarget3 exceeds the second rpm value $n_2$ starting from the fourth time point $t_3$, does the output of the maximum selection element 40 again correspondingly increase in order to reach the third rpm value $n_3$ at the fifth time point $t_4$. In this way, the desired value ndes increases as the output of the minimum selection element 35 up to the fifth time point $t_4$ from the second rpm value $n_2$ to the third rpm value $n_3$. The dropping of the third target value ntarget3 after the fifth time point $t_4$ does not lead to a reduction of the desired value ndes for the reasons already described. Rather, the desired value ndes is maintained starting from the fifth time point $t_4$ notwithstanding the dropping of the third target value ntarget3. Starting from the sixth time point $t_5$, the third target value ntarget3 increases above the third rpm value $n_3$ so that the output of the maximum selection element 40 increases in a corresponding manner. At the seventh time point $t_6$, the third target value ntarget3 reaches the fourth rpm value $n_4$ and therefore the resulting target value ntarget so that a further increase of the third target value ntarget3 from the seventh time point $t_6$ cannot lead to a further increase of the output of the minimum selection element 35 and therefore of the desired value ndes. A dropping of the desired value ndes for the motor rpm after the seventh time point $t_6$ is then again only possible with the dropping of the resulting target value ntarget.

The resulting target value ntarget is also reached by the desired value ndes for the motor rpm only at the seventh time point $t_6$ in the trace of FIG. 4, however, the desired value ndes successively approaches the resulting target value ntarget already starting from the second time point $t_1$ so that the power deficit for the at least one requesting motor-specific or vehicle-specific component is successively reduced without the driving comfort being affected thereby.

With the method of the invention and the arrangement of the invention, this target value is not immediately assumed as a desired value for the control and therefore, for the driver, is not assumed in a jolt-like manner when there is a request of at least one motor-specific or vehicle-specific component for an increase of the desired value for the output quantity of the drive unit (in this example, the motor rpm) to a target value. In this way, the driving comfort is not affected. With the successive increase of the desired value in correspondence to the driver command, the power deficit of the at least one requesting motor-specific or vehicle-specific component is, however, simultaneously reduced. In this way, an optimal supply of the at least one requesting motor-specific or vehicle-specific component with mechanical power is ensured without, at the same time, affecting the driving comfort.

The desired value in this example is the desired value for the idle controller 25 and therefore the motor rpm which is to be adjusted in idle as a first operating state. The idle controller 25 controls the idle rpm for the motor but also controls the desired value ndes in at least a second operating state different from the first operating state or from the idle state in order to be able to satisfy the requests of the motor-specific component or vehicle-specific component, that is, for example, the above-mentioned ancillary equipment. Therefore, the second operating state can be characterized by a set gear with a closed clutch for example.

The method of the invention and the arrangement of the invention of the described increase of the desired value with the increase of the driver command, which is pregiven at the accelerator pedal 10, up to reaching the target value and therewith especially the successive increase of the desired value up to maximally the target value can be realized in the manner described in the first operating state of the vehicle as well as in the second operating state of the vehicle. Departing from the described example, for the case that the third target value ntarget3 would not reach the resulting target value ntarget, the desired value would also not reach this resulting target value ntarget. Accordingly, for the invention, it is not absolutely necessary that the target value be reached by the desired value. The desired value can, however, only be increased in a direction toward the target value with the increase of the driver command present at the accelerator pedal 10 when the desired value is less than the target value. As soon as the desired value has reached the target value, the desired value can no longer be increased. The increase of the desired value corresponds to the increase of the driver command, which is pregiven at the accelerator pedal 10, that is, in the described example, to the increase of the third target value ntarget3 insofar as the third target value ntarget3 exceeds the desired value reached previously. The increase of the desired value in the direction toward the target value can thereby be stopped in advance of reaching the target value when the driver command, which is pregiven at the accelerator pedal 10, drops again. This case is also shown in the example of FIG. 4 for the region between the third time point $t_2$ and the fourth time point $t_3$ as well as for the region between the fifth time point $t_4$ and the sixth time point $t_5$.

It is understood that the foregoing description is that of the preferred embodiments of the invention and that various changes and modifications may be made thereto without departing from the spirit and scope of the invention as defined in the appended claims.

What is claimed is:

1. A method for controlling an output quantity of a drive unit of a vehicle for at least a first operating state of said vehicle, the method comprising the steps of:

adjusting a desired value for said output quantity to a target value in dependence upon at least a request of a motor-specific component or a vehicle-specific component;

adjusting said target value in dependence upon that a driver command, which is inputted at an operator-controlled element, reaches said target value in a first operating state or in a second operating state different from said first operating state; and, likewise increasing said desired value for said output quantity up to reaching said target value with an increase of said driver command inputted at said operator-controlled element.

2. The method of claim 1, wherein the desired value is maintained when there is a drop of said driver command inputted at said operator-controlled element.

3. The method of claim 1, wherein a motor rpm is selected as said output quantity.

4. The method of claim 1, wherein a torque is selected as said output quantity.

5. The method of claim 1, wherein a power is selected as said output quantity.

6. The method of claim 1, wherein an idle state is selected as said first operating state.

7. An arrangement for controlling an output quantity of a drive unit of a vehicle for at least a first operating state of said vehicle, the arrangement comprising:

means for adjusting a desired value for said output quantity to a target value in dependence upon at least a request of a motor-specific component or a vehicle-specific component;

said means functioning to adjust said target value in dependence upon that a driver command, which is inputted at an operator-controlled element, reaches said target value in a first operating state or in a second operating state different from said first operating state; and, said means being adapted to likewise increase said desired value for said output quantity up to reaching said target value with an increase of said driver command inputted at an operator-controlled element.

* * * * *